Patented June 27, 1944

2,352,460

UNITED STATES PATENT OFFICE 2,352,460

PROCESS FOR THE TREATMENT OF RUBBER WASTE

Angiolo Treves, New York, N. Y., assignor, by mesne assignments, to Rubber & Plastics Compound Company, Inc., New York, N. Y., a corporation of New York No Drawing. Application January 21, 1941, Serial No. 375,292. In France May 9, 1940

2 Claims. (Cl. 260—717)

This invention relates to a method for treating rubber waste materials and to a composition produced by this method which is easily soluble in the customary solvents for crude rubber and may be vulcanized in the same manner and with similar results as the latter.

In the methods hitherto known for treating rubber waste materials high temperatures of sometimes as high as 200-270° C. are generally applied in order to obtain economical results. The rubber waste hereby undergoes an excessive and uneven depolymerization and consequent partial destruction of its molecule; the thus obtained rubber product is practically insoluble in the customary crude rubber solvents, e. g. benzol, benzine, carbonic disulphide, carbontetrachloride and others.

It is the object of the invention to convert the rubber waste within a comparatively short period and at a temperature lying beneath its melting point into a uniformly depolymerized material which is soluble in the customary rubber solvents and, therefore, may be used to produce commercial rubber solutions and emulsions.

With this purpose in view the ground rubber waste is treated with abietic acid or sylvic acid or substances containing the same in the absence of water or steam.

The contact with the resins may be improved by continuous agitation and the mixture is heated to a temperature below the melting point of the rubber component.

The application of abietic acid, colophony and similar substances is known in the manufacture of waterproof insulating viscous rubber compositions. However, in the case of the known processes the rubber is heated with the said substances to high temperatures whereby the rubber is molten. In other words, it is a significant feature of the known processes to melt the rubber together with the resins or the fatty oils or bituminous substances or hydrocarbons.

In full contradiction to this known processes the resins are used in the present case at a low temperature of 140° C. to about 180° C. and the temperature is maintained below the melting point of the rubber component of the charge. The added quantities, therefore, may vary between 4 to 10% of the rubber weight; or else the danger arises that the entire mixture reaches the softening or melting point. The added quantity of resins may preferably vary within about 4 to 10%. It is a surprising result that by using the resins and particularly the abietic acid within the range of the said low temperatures a rubber product is obtained by way of a short treatment period of approximately 1 to 2 hours which is easily soluble in crude rubber solvents.

These solutions may be used in the same manner as crude rubber solutions for cementing and waterproofing and other suitable purposes.

It has been already suggested to reclaim mixtures of rubber waste and bitumen, pine oil, or other softeners, by heating the same to a temperature of about 150° C.; however, in this case water is added producing steam at the treating temperature. Needless to state that by the addition of even small quantities of steam producing water working conditions are created which are essentially different from those of the present method. The product resulting from the known process is not soluble in crude rubber solvents.

As previously stated the reclaimed rubber products produced by the known processes are not soluble in crude rubber solvents and it is the object of this method to transform such nonsoluble materials into soluble ones. Consequently, the possibility of employing reclaim as a substitute for crude rubber is remarkably enlarged.

An equal result is obtained by treating the commercial rubber reclaim in the same manner as recited for rubber waste materials; in this case the duration of the treatment is reduced to about an hour.

Furthermore, it is important that this method may be also carried out with the reclaimed waste before its final treatment by milling, kneading and sheeting is effected. These expensive operations are eliminated hereby and the cost of the final soluble product is greatly reduced.

In the following an example is specified for carrying out the present method.

Waste automobile inner tubes after being freed from foreign matter are disintegrated in a suitable grinding machine to a particle size of 12 to 15 mesh/sq. inch. A quantity of pulverulent abietic acid equal to 6% of the rubber contents of the charge is introduced into a treating vessel provided with a mixing blade equipment. The abietic acid is heated to approximately 170° C. and this temperature is maintained in the treating vessel during the entire treatment. The mixing equipment is set into motion. The ground rubber waste is gradually charged into the vessel and intimately contacted in its solid or non-molten state with the abietic acid. The treatment is maintained for a period of 90 minutes.

The thus obtained homogenous mass is removed from the treating vessel and allowed to cool. It is without further mechanical disintegration in a condition to be easily dissolved in crude rubber solvents and, therefore, forms a material adapted to be used for the manufacture of commercial rubber solutions and emulsions.

I claim:

1. Process for the manufacture of a vulcanizable rubber reclaim which is soluble in customary rubber solvents selected from the group consisting of benzol, benzine, carbon disulphide and carbon tetrachloride, consisting in mixing a mixture consisting of ground vulcanized rubber scrap and about 4-10% of a substance selected from a group consisting of abietic acid and sylvic acid in the absence of water and steam for a period of about 1 to 2 hours, while maintaining a temperature of between 140 to 180° C.

2. Process for the manufacture of vulcanizable rubber reclaim which is soluble in customary rubber solvents selected from the group consisting of benzol, benzine, carbon disulphide and carbon tetrachloride, consisting in mixing a mixture consisting of ground vulcanized rubber scrap and about 4-10% of a substance selected from a group consisting of abietic acid and sylvic acid in the absence of water and steam for a period of about 1 to 2 hours, while maintaining a temperature of about 170° C.

ANGIOLO TREVES.